United States Patent
Brown et al.

(10) Patent No.: US 11,509,747 B2
(45) Date of Patent: Nov. 22, 2022

(54) PATH SELECTION FOR CONTENT DELIVERY NETWORK

(71) Applicant: BRITISH TELECOMMUNICATIONS PUBLIC LIMITED COMPANY, London (GB)

(72) Inventors: Ruth Brown, London (GB); Jonathan Hart, London (GB); Maria Cuevas Ramirez, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 17/250,241

(22) PCT Filed: May 31, 2019

(86) PCT No.: PCT/EP2019/064201
§ 371 (c)(1),
(2) Date: Dec. 21, 2020

(87) PCT Pub. No.: WO2019/243021
PCT Pub. Date: Dec. 26, 2019

(65) Prior Publication Data
US 2021/0152664 A1    May 20, 2021

(30) Foreign Application Priority Data
Jun. 21, 2018  (EP) .................................. 18179151

(51) Int. Cl.
*H04L 29/08*   (2006.01)
*H04L 67/63*   (2022.01)
(Continued)

(52) U.S. Cl.
CPC .......... *H04L 67/63* (2022.05); *H04L 67/1078* (2013.01); *H04L 67/306* (2013.01); *H04L 67/568* (2022.05); *H04L 67/61* (2022.05)

(58) Field of Classification Search
CPC ....................................... H04L 67/28–67/2852
See application file for complete search history.

(56) References Cited

U.S. PATENT DOCUMENTS

| | | | |
|---|---|---|---|
| 4,731,878 A | 3/1988 | Vaidya | |
| 5,586,128 A | 12/1996 | Chen | |

(Continued)

FOREIGN PATENT DOCUMENTS

| | | |
|---|---|---|
| EP | 1278325 A2 | 1/2003 |
| EP | 1499054 A2 | 1/2005 |

(Continued)

OTHER PUBLICATIONS

Combined Search and Examination Report under Sections 17 and 18(3) for Great Britain Application No. 1810216.0, dated Dec. 18, 2018, 7 pages.

(Continued)

*Primary Examiner* — Clayton R Williams
(74) *Attorney, Agent, or Firm* — Patterson Thuente IP

(57) ABSTRACT

In a method of operating a content delivery network having a plurality of content caches to deliver requested content to at least one user device, the user device has one or more access network interfaces for connection to content caches of the content delivery network via one or more respective access networks, and the method is performed by a content delivery route decision function running on the user device and interfacing with the content delivery network and the access networks.

18 Claims, 3 Drawing Sheets

(51) Int. Cl.
  *H04L 67/1074* (2022.01)
  *H04L 67/306* (2022.01)
  *H04L 67/61* (2022.01)
  *H04L 67/568* (2022.01)

(56) References Cited

U.S. PATENT DOCUMENTS

| | | | |
|---|---|---|---|
| 6,476,945 | B1 | 11/2002 | Archambault |
| 6,738,354 | B1 | 5/2004 | Ashwood Smith |
| 6,763,190 | B2 | 7/2004 | Agrawal et al. |
| 6,775,230 | B1 | 8/2004 | Watanabe et al. |
| 6,850,705 | B2 | 2/2005 | Su et al. |
| 7,113,481 | B2 | 9/2006 | Elie-Dit-Cosaque et al. |
| 7,171,124 | B2 | 1/2007 | Smith et al. |
| 7,224,897 | B1 | 5/2007 | Slezak et al. |
| 7,249,169 | B2 | 7/2007 | Blouin et al. |
| 7,283,741 | B2 | 10/2007 | Sadananda |
| 7,289,730 | B2 | 10/2007 | Matsuura et al. |
| 7,539,210 | B2 | 5/2009 | Iovanna et al. |
| 7,599,621 | B2 | 10/2009 | Guy et al. |
| 7,650,376 | B1* | 1/2010 | Blumenau ............ H04L 67/1002 709/217 |
| 7,725,035 | B2 | 5/2010 | Tyan et al. |
| 8,516,147 | B2* | 8/2013 | Kaspar ................ H04L 65/601 709/236 |
| 2002/0030867 | A1 | 3/2002 | Iannone et al. |
| 2002/0093703 | A1 | 7/2002 | Maeno |
| 2002/0145783 | A1 | 10/2002 | Chang et al. |
| 2002/0191247 | A1 | 12/2002 | Lu et al. |
| 2003/0016414 | A1 | 1/2003 | Solheim et al. |
| 2003/0030866 | A1 | 2/2003 | Yoo |
| 2003/0161632 | A1 | 8/2003 | Wang |
| 2003/0198227 | A1 | 10/2003 | Matsuura et al. |
| 2003/0233423 | A1* | 12/2003 | Dilley ................... H04L 29/06 709/214 |
| 2004/0022194 | A1 | 2/2004 | Ricciulli |
| 2004/0120705 | A1 | 6/2004 | Friskney et al. |
| 2004/0208504 | A1 | 10/2004 | Solheim et al. |
| 2004/0220886 | A1 | 11/2004 | Kumaran et al. |
| 2004/0246896 | A1 | 12/2004 | Hoang et al. |
| 2004/0246912 | A1 | 12/2004 | Hoang et al. |
| 2004/0246973 | A1 | 12/2004 | Hoang et al. |
| 2004/0258409 | A1 | 12/2004 | Sadananda |
| 2005/0008367 | A1 | 1/2005 | Laalaoua |
| 2005/0069314 | A1 | 3/2005 | De Patre |
| 2005/0069316 | A1 | 3/2005 | Vigoureux et al. |
| 2006/0002716 | A1 | 1/2006 | Guy et al. |
| 2006/0188252 | A1 | 8/2006 | Schluter |
| 2008/0037982 | A1 | 2/2008 | Niven-Jenkins et al. |
| 2008/0056717 | A1 | 3/2008 | Niven-Jenkins et al. |
| 2009/0060505 | A1 | 3/2009 | Bernstein et al. |
| 2012/0082131 | A1 | 4/2012 | Agrawal et al. |
| 2012/0290677 | A1* | 11/2012 | Puthalath ............ H04L 67/1002 709/214 |
| 2014/0189036 | A1 | 7/2014 | Bhatia et al. |
| 2014/0189060 | A1 | 7/2014 | Westphal |
| 2014/0365556 | A1* | 12/2014 | Rehan .................... H04L 65/60 709/203 |
| 2015/0067092 | A1 | 3/2015 | Crowe et al. |
| 2015/0215396 | A1 | 7/2015 | Puthalath et al. |
| 2016/0029287 | A1 | 1/2016 | Randriamasy et al. |
| 2016/0308907 | A1* | 10/2016 | Le ....................... H04L 12/4641 |
| 2016/0323408 | A1 | 11/2016 | Chung et al. |
| 2017/0277806 | A1 | 9/2017 | Trossen et al. |
| 2017/0366445 | A1* | 12/2017 | Nemirovsky ........... H04L 45/24 |
| 2019/0068701 | A1* | 2/2019 | Han ..................... H04L 47/822 |

FOREIGN PATENT DOCUMENTS

| | | |
|---|---|---|
| EP | 2615791 A1 | 7/2013 |
| EP | 2816847 A1 | 12/2014 |
| EP | 3005781 A4 | 12/2016 |
| EP | 3198838 A1 | 8/2017 |
| EP | 3785469 A1 | 3/2021 |
| IN | 201841020197 | 6/2019 |
| JP | 2002064529 A | 2/2002 |
| WO | WO-03079596 A1 | 9/2003 |
| WO | WO-2004002078 A1 | 12/2003 |
| WO | WO-2011073707 A1 | 6/2011 |
| WO | WO-2014029419 A1 | 2/2014 |
| WO | WO-2019231258 A1 | 12/2019 |

OTHER PUBLICATIONS

Examination Report under Section 18(3) for Great Britain Application No. 1810216.0, dated Jun. 19, 2020, 5 pages.
Extended European Search Report for Application No. 18179151.8, dated Oct. 22, 2018, 7 pages.
International Search Report and Written Opinion for Application No. PCT/EP2019/064201, dated Jun. 26, 2019, 12 pages.
Munaretto D., et al., "Online Path Selection for Video Delivery Over Cellular Networks," IEEE Globecom, Workshop Quality of Experience for Multimedia Communications, 2012, pp. 1367-1372.
Bagchi N., "Route Selection with Multiple Metrics," Information Processing Letter, Amsterdam, vol. 64 (4), Nov. 1997, pp. 203-205.
Examination Report under Section 18(3) for Great Britain Application No. 1810216.0, dated Mar. 17, 2021, 3 pages.
International Search Report for Application No. PCT/GB2005/002728, dated Aug. 26, 2005, 2 pages.
International Search Report for Application No. PCT/GB2005/002736, dated Oct. 21, 2005, 2 pages.
Office Action dated Aug. 20, 2009 for U.S. Appl. No. 11/632,531, filed Jan. 17, 2007, 19 pages.
Office Action dated Aug. 20, 2009 for U.S. Appl. No. 11/632,533, filed Jan. 17, 2007, 19 pages.
Office Action dated Apr. 27, 2010 for Japanese Application No. 2007-522008 filed Jul. 12, 2005, 2 pages. (Official action only).
Office Action dated Oct. 5, 2010 for Japanese Application No. 2007-522008 filed Jul. 12, 2005, 2 pages. (Official action only).
Examination Report under Section 18(3) for Great Britain Application No. 1810216.0, dated Jul. 29, 2021, 4 pages.
Examination Report under Section 18(3) for Great Britain Application No. 1810216.0 dated Jan. 12, 2022, 3 pages.

* cited by examiner

PATH SELECTION FOR CONTENT DELIVERY NETWORK

PRIORITY CLAIM

The present application is a National Phase entry of PCT Application No. PCT/EP2019/064201, filed May 31, 2019, which claims priority from EP Patent Application No. 18179151.8, filed Jun. 21, 2018, each of which is hereby fully incorporated herein by reference.

TECHNICAL FIELD

This disclosure relates to improvements in routing for delivering multimedia data stored in a Content Delivery Network (CDN) to user devices.

BACKGROUND

In present 4G and future 5G infrastructures, content can be delivered from a CDN to a user device via a number of different radio access networks such as cellular base stations, Wireless local area networks (WLANs), satellite, personal area networks, etc. A user device having the appropriate network interfaces can be attached to all available access networks simultaneously, subject to battery considerations.

Today's environments have multiple access networks (e.g. 4G, WiFi), multiple backhaul technologies, content and application instances stored in different places in the network. A device can connect to all those different access networks and move between them (whilst in coverage of one or more access networks at any point in time).

In order to optimize network use and end-user experience the device, with support from the network, needs to select the right access technology at any point in time. In existing arrangements, an appropriate access network to be used for a given data transfer is selected by the device based on frequency priority, signal strength, device preferences, etc., with no involvement from the network operator.

SUMMARY

According to the disclosure, there is provided a method of operating a content delivery network having a plurality of content caches to deliver requested content to at least one user device, the user device having one or more access network interfaces for connection to content caches of the content delivery network via one or more respective access networks, in which the method is performed by a content delivery route decision function running on the user device and interfacing with the content delivery network and the access networks, the method comprising: generating a request for an item of content available on the content delivery network; determining which of the plurality of content caches contain the requested content; evaluating candidate options for delivering said requested content to the user device from different content caches; selecting a candidate option determined to be optimal for delivering said requested content; instructing the user device to request the item of content via an access network associated with the selected candidate option; and delivering the requested content to the user device.

The user device may maintain a database of neighbor content caches and access network properties, and accomplish the determining and the evaluating from the data in the database.

Alternatively, the user device may transmit data requests to one or more content caches in response to the generation of a content request, and identify an optimal cache from the outcomes of those requests. It may transmit data requests to a plurality of caches in a predetermined sequence, selecting for content delivery the first cache identified to have the required content. The sequence may be determined by properties of respective connections between the user device and the respective access points associated with each cache.

The content delivery route decision function may monitor the quality of network paths between a plurality of caches and the user device location, so that when a user device requests data available on the content delivery network, the content delivery route decision function is able to determine the most suitable data source and path.

If the requested content is available at a cache associated with an access node to which the user device is currently connected, the data can be served from that cache, and if it is not available from that cache, and it is determined that the requested content is available at another access point which is in range of the user device, the user device can be handed over to that access point and data served from that cache by way of that access point. To facilitate this, data may be received from the user device relating to associations between access nodes available to the device, and listings of data available in the content caches of the available access nodes. This data may be provided as part of a Content Request message from the user device.

The user terminal may periodically perform a query to the cache associated with each available access node, to determine if it has the requested content. Alternatively, a database of available content associated with the decision function may be periodically updated by interrogating the content delivery network caches.

The decision function may obtain path cost metrics of the proximity between each candidate cache and the user device via an access network, and uses the metrics to calculate the performance and financial cost of delivering the content via each access network.

If no local cache is identified, access may default to delivery from a centralized content delivery network cache.

As well as availability of the required content, suitability may be determined according to signal strength and any one or more of the following factors: proximity between the user terminal and the cache, network load, latency, CPU Load, Network Type, time of day, contention rate, bandwidth, operator metrics, quality of service parameters, or security.

Two or more separate access networks may be selected to deliver requested data to the user device in parallel.

The disclosure also extends to a computer system including a processor and a memory storing computer program code for performing the process of the disclosure, and to a computer program element comprising computer program code to, when loaded into a computer system and executed thereon, cause the computer to perform the process.

This invention relates to functionality in the core network to direct a user device to select an access network at a given time, and based on the content location, that provides the best user experience and maximizes efficiency to the operator, and to direct the device to connect to that access network.

A Content Delivery Route Decision Function (CDRDF) is provided as a network core function, located on the edge of the network core, to interface with the CDN and the access networks. The CDRDF monitors the quality of the network paths between the CDN caches and user device locations, so that when a user device requests data available on the CDN, the CDRDF is able to determine the most suitable data source and path.

In an embodiment to be described in detail later, the currently connected access node's local cache is checked and if the requested content is available, the data is served. If it is not available locally, the process determines whether the requested content is available at any other access point which is in range. To enable this step, the CDRDF uses data received from the user device, associations between access nodes available to the device and the access node's local CDN cache, and listings of data available in each CDN cache. These listings may be look-up tables maintained by each individual cache, interrogated at the time a request is made, or a centrally-maintained look-up table, periodically updated by each cache reporting its content to the database. The CDRDF maintains, or obtains, path cost metrics of the proximity between the CDN candidate cache to the user device via an access network and uses that to calculate the performance and financial cost of potentially delivering the content via each access network. The process can default to a conventional CDN delivery, if that path is not identified earlier.

In some embodiments, only content availability and signal strength are used to determine suitability. Other embodiments take into account other factors, such as proximity to the CDN, network load, etc. Two or more separate access networks may be selected to deliver requested CDN data to the user device in parallel.

Embodiments of the disclosure may make use of existing features of the converged network architecture, which can play a role in determining to which access node a User Equipment (UE) should be connected. Such features include the "Access network discovery and selection function" (ANDSF), which is an entity within an LTE Core Network. The purpose of the ANDSF is to assist the UE to discover non-3GPP access networks (WiFi) that can be used for data communications in addition to 3GPP access networks (LTE) and to provide the UE with rules policing the connection to these networks. Operators define per-user policies to control how and when WLAN and cellular networks are used. The ANDSF consists of a standard XML based policy format and OMA-DM based network transport protocol. Policies tend to be relatively static and typically updated weekly or monthly.

The equivalent function in the proposed 5G standard is the access traffic steering, switching and splitting (ATSSS) function, which makes decisions on access node connectivity for the user terminal.

BRIEF DESCRIPTION OF THE DRAWINGS

An embodiment of the invention will now be described by way of example, with reference to the drawings, in which.

DETAILED DESCRIPTION

Figure 1:
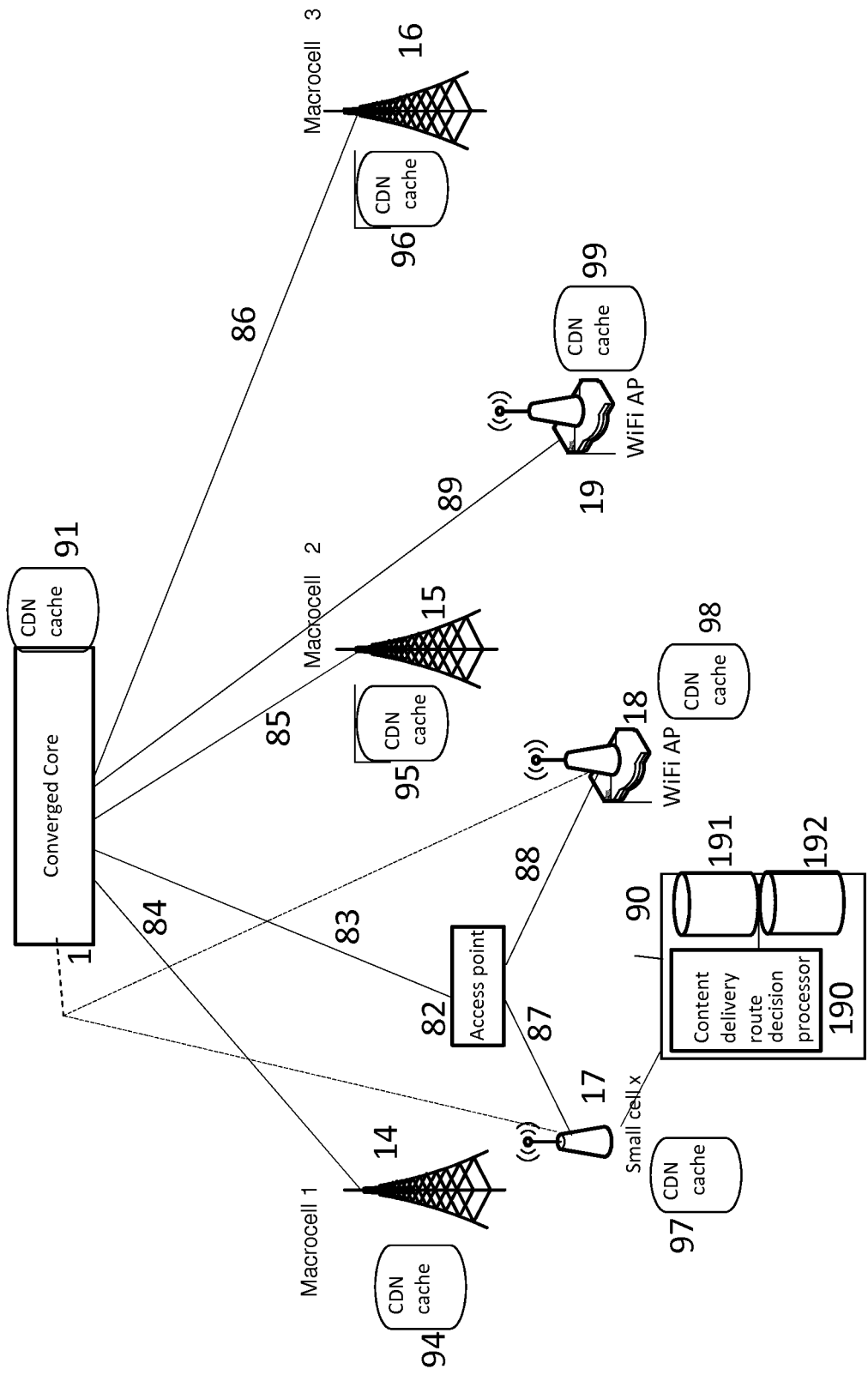
FIG. 1 is a schematic representation of an embodiment of a CDN Path Selection Architecture.
Figure 2:
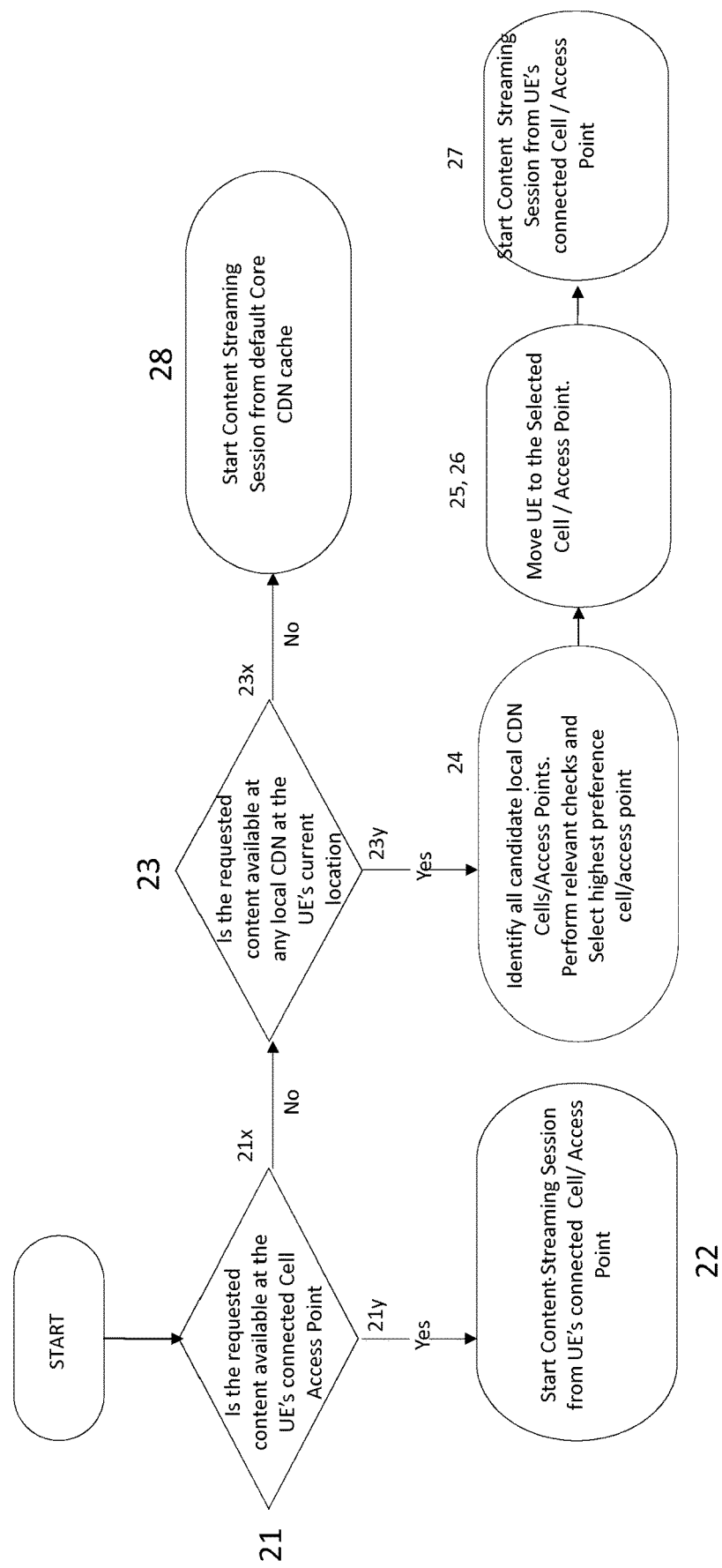
FIG. 2 is a flow chart depicting a Content Delivery Route Decision Function.

FIG. 1 depicts a Network Architecture for an embodiment of this disclosure. In the embodiment of FIG. 1, the decision processor 190 is embodied in a user terminal 90, together with an associated database 192 storing data on the content stored in each of the local caches 94, 95, 96, 97, 98, 99. The resulting decision tree is depicted in FIG. 2. The database 192 may be populated by data broadcast from a central co-ordinating content delivery network controller 13, or by periodic updates broadcast by each local CDN cache 94, 95, 96 . . . within range of the cell 17 serving the user terminal.

When a user terminal 90 transmits a request for a piece of content, a decision is required as to which Cell or Access Point the terminal should connect to, in order to be connected to the optimum CDN cache and therefore improve the user's quality of experience for the session. The optimum cache will normally be the topologically closest cache to the user terminal that has the required content, but this selection may be modified subject to considerations such as bandwidth. To achieve this, a new function is required—herein referred to as the 'Content Delivery Route Decision Function.' This function is managed by a Content Delivery Route Decision processor 190 which determines where the UE is to be connected for delivery of a particular piece of content, based both on information received from the content request, and information about each CDN node.

The embodiment can be adapted to both LTE and 5G implementations.

FIG. 2 is a flow chart depicting the decision logic used by the Content Delivery Route Decision processor 190.

It will be seen that there are three possible outcomes 22, 25, 28 of this process, depending on two decision points 21, 23.

If the requested content is identified by the decision processor 190 using the data stored in the content database 192 as being available in a cache 97 located at the access point 17 to which the user terminal is currently connected (21, outcome 21y), streaming can be initiated from that access point (22).

If the requested content is identified by the decision processor 190 using the data stored in the content database 192, as being available in one or more caches 94, 95, 96, 98, 99 located at access points 14, 15, 16, 18, 19 other than that to which the user terminal is currently connected, but within range (outcomes 21x, 23y), the most appropriate of those access points is selected (step 24), and the user terminal handed off to that terminal (25) so that streaming can be initiated from that access point (27). If no local access point has the requested content (outcomes 21x and 23x), the terminal connects, through its existing connection 17, to the default cache 91 (28).

It should be noted that a negative outcome (21x, 23x) may result at 21 or 23 either because a cache associated with the relevant access point does not have the required content, or because the access point has no associated caching facility.

The processes initiated by these outcomes will now be discussed in more detail with reference to FIG. 3, which illustrates the process applied to the LTE standard architecture. In the LTE standard the access nodes 17 are known as "enhanced nodes B" (eNB)

An initial attachment process 200 of the user terminal 90 to a packet gateway 102 in the core network 1 takes place in a conventional manner. When a user requires content to be downloaded from the content delivery network, the user terminal 90 generates a content request 922, including address data (e.g., a URL) for the content.

Information about the association between each access node 14, 15, 16, 17, 18, 19 and its respective local CDN cache 94, 95, 96, 97, 98, 99, and also a list of content stored at each local CDN cache is stored in the content database 192. When a 'Content Request' message 20 is received from the UE, the Content Delivery Route Decision processor 12 performs an initial check 21 to establish whether the requested content is available at a CDN cache 13 associated with the access node 17 to which the user terminal 90 is currently connected.

The checking process 21 may also include assessment of the currently connected access node 17 to determine whether it meets a minimum required signal strength, using data specified by the user terminal 90 in the 'Content Request' message 20.

Parameters which may be taken into account to select an appropriate CDN cache include Proximity to CDN, Signal Strength Latency, CPU Load, Network Type, Time of Day, Number of other Users (contention rate) Cell Bandwidth, Operator Metrics (Cost of Route), Quality of service parameters, and security.

The 'Content Delivery Route Decision processor 190 then instructs a mobility management entity in the core network 1 to manage a handover of the UE 90 to hand over to this node 14 (25, 26, 261, 262, 263). The content request 20 can then be forwarded to that access node's local CDN cache 94 (27) for delivery of the content (29)

If it is not possible to identify a local access point having a cache with the required content (outcome 23x), the content delivery route decision processor 12 sends the request to the Core CDN 91 (28) and the streaming session is established in the conventional manner (29).

If the user terminal 90 has a dual connectivity capability, it may use two or more access nodes in order to receive the content from multiple CDN sources. Following a content request 20, the Content Delivery Route Decision processor 12 determines which of the local caches 94, 97, 98 have the required content. The Content Delivery Route Decision processor then selects two Access Nodes (or more, if the user terminal can support more than two links) with the strongest signals (24) to deliver the content to the UE. No distinction is made in the selection process 23 between the currently-serving access point 17 and any other local access points 14, 18, and thus, in this dual connectivity embodiment, 21 in FIG. 2 can be omitted.

The user terminal 90 then attaches to both all of the access points selected (25). It is of course unnecessary to reattach to the currently serving access point 17, if that is one of those selected, as it has already been attached (200). The UE would need the capability to synchronize/buffer the received packets from the multiple CDN sources.

In an alternative embodiment, the route decision processor 190 assesses the content of each local cache at the time a request is made. The information flows in this embodiment are depicted in FIG. 3.

In this embodiment, the user terminal 90 initiates a request for content by sending a request 922 for the content to the local cache 97 associated with the currently-serving base station 17. If the local cache 97 has the requested content (921) it delivers the content requested (933) to the user terminal 90.

The user terminal 90 may have a number of options available in regard to which access node and local CDN cache to connect to for a particular content request and the Content Delivery Route Decision processor 190 directs the User terminal 90 to connect to the best one available.

In this embodiment, if the content is not available at the local cache (192), or the local base station 17 has no associated cache, the user terminal transmits a request to each other cache, either as a broadcast to all cells in range, or in a sequence determined from data stored in a database 191 relating to properties of the connections between the user terminal 90 and the individual base stations 14, 15, 16, 18, 19, such as network topology and signal quality. The user terminal selects the first cache in the sequence which reports that it has the required content.

Figure 3:
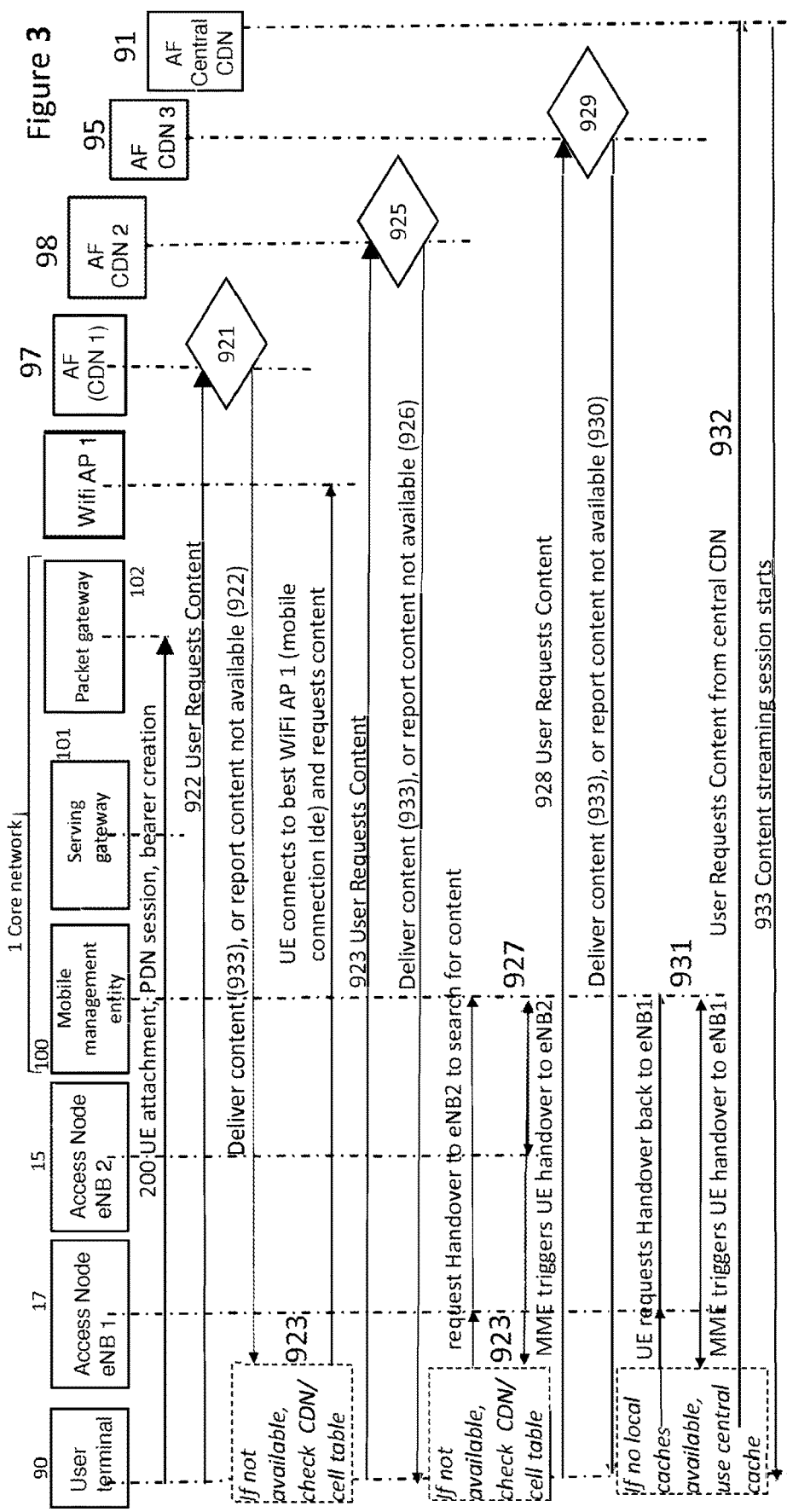
FIG. 3 depicts a CDN Path Selection Call Flow in this embodiment for three different conditions.

In the example depicted in FIG. 3, if the local cache 97 does not have the requested content (922) the user terminal checks the database 191 (923) and transmits enquiries to one or more caches 98 associated with access points 18 on the same local area network, served by a common access point 82 (924). If the local cache(s) 98 has the requested content (925) it delivers the content requested (933) to the user terminal 90. If the content is not available at the local cache 98, or the local base station 18 has no associated cache, a report is returned that the content is not available (926).

If no local access point has a cache with the available content, the CDN and cell data 191 are checked again (923) for other cellular access points 14, 15, 16 within range. A handover 927 is arranged to one of them (access point 15 in this example) and a request to the (or each) cache 95 associated with that access point is made (928) for the required content. If the cache 95 has the required content (929) it delivers it (933) or otherwise it reports the content is not available (930). The activities at 927-930 may be repeated, with further handovers, until a cache having the required content is identified, or all local access points have been attempted, or until a maximum number of attempts have been made.

If no cache has been identified as having the required content, user terminal 90 arranges a handover (931) back to the originally serving access node 17 (as this is would be the one with the best signal qualities) and a request is sent to the central cache 91 (932) for delivery of the content (933).

It should be noted that in all these embodiments, a handover is only required if the content is to be delivered from a cache associated with a neighbor cell. If the content is available at the currently serving cell 17, or only at the core cache 91, it is delivered using the currently serving cell, without the need for a handover.

The invention claimed is:

1. A method of operating a content delivery network having a plurality of content caches to deliver requested content to at least one user device, the at least one user device having one or more access network interfaces for connection to the plurality of content caches of the content delivery network via one or more respective access networks, the method comprising:
   by a content delivery route decision function running on the at least one user device and interfacing with the content delivery network and the access networks:
   generating a request for an item of content available on the content delivery network;
   determining which of the plurality of content caches contain the requested item of content;
   evaluating candidate options for delivering the requested item of content to the at least one user device from the determined plurality of content caches;
   selecting, from the determined plurality of content caches, a candidate option determined to be preferred for delivering the requested item of content based on at least one of network utilization or Quality of Experience, wherein if the requested item of content is available at a cache associated with an access node to which the at least one user device is currently connected, the cache is the selected candidate option;

instructing the at least one user device to request the item of content via an access network associated with the selected candidate option; and delivering the requested item of content to the at least one user device.

2. The method according to claim 1, wherein the at least one user device maintains a database of neighbor content caches and access network properties, and carries out the determining and the evaluating from data in the database.

3. The method according to claim 1, wherein the at least one user device transmits data requests to one or more content caches in response to the generation of a content request, and identifies the candidate option from outcomes of the data requests.

4. The method according to claim 3, wherein the at least one user device transmits the data requests to a plurality of caches in a predetermined sequence, selecting for content delivery a first cache identified to have the required content.

5. The method according to claim 4, wherein the predetermined sequence is determined by properties of respective connections between the at least one user device and the respective access points associated with each content cache.

6. The method according to claim 1, wherein the content delivery route decision function monitors quality of network paths between a plurality of content caches and a location of the at least one user device, so that when at least one user device requests data available on the content delivery network, the content delivery route decision function is able to determine a data source and a path having a quality in excess of a threshold requirement.

7. The method according to claim 1, wherein if the requested item of content is not available from the cache associated with an access node to which the at least one user device is currently connected cache, and it is determined that the requested item of content is available at another access point which is in range of the at least one user device, the at least one user device is handed over to the another access point and data is served from that cache by way of the another access point.

8. The method according to claim 1, wherein data is received from the at least one user device relating to associations between access nodes available to the at least one user device, and listings of data available in the content caches of the available access nodes.

9. The method according to claim 8, wherein the data is provided as part of a Content Request message from the at least one user device.

10. The method according to claim 8, wherein the user device periodically performs a query to the content cache associated with each available access node, to determine if the content cache associated with each available access node has the requested item of content.

11. The method according to claim 8, wherein a database of available content associated with the decision function is periodically updated by interrogating the content delivery network caches.

12. The method according to claim 1, wherein the decision function obtains path cost metrics of a proximity between each candidate content cache and the at least one user device via an access network, and uses the obtained path cost metrics to calculate a performance and a financial cost of delivering the requested item of content via each access network.

13. The method according to claim 1, wherein access defaults to delivery from a centralized content delivery network cache if no local cache is identified.

14. The method according to claim 1, wherein content availability and signal strength are used to determine suitability of a candidate option.

15. The method according to claim 14, wherein one or more of the following factors are also used to determine suitability of a candidate option:

proximity between the user terminal and the cache, network load, latency, CPU Load, Network Type, time of day, contention rate, bandwidth, operator metrics, quality of service parameters, or security.

16. The method according to claim 1, wherein two or more separate access networks are selected to deliver requested data to the user device in parallel.

17. A computer system comprising:

at least one processor and a memory storing computer program code for operating a content delivery network having a plurality of content caches to deliver requested content to at least one user device, the at least one user device having one or more access network interfaces for connection to the plurality of content caches of the content delivery network via one or more respective access networks, which is performed by a content delivery route decision function running on the at least one user device and interfacing with the content delivery network and the access networks, by:

generating a request for an item of content available on the content delivery network;

determining which of the plurality of content caches contain the requested item of content;

evaluating candidate options for delivering the requested item of content to the at least one user device from the determined plurality of content caches;

selecting, from the determined plurality of content caches, a candidate option determined to be preferred for delivering the requested item of content based on at least one of network utilization or Quality of Experience, wherein if the requested item of content is available at a cache associated with an access node to which the at least one user device is currently connected, the cache is the selected candidate option;

instructing the at least one user device to request the item of content via an access network associated with the selected candidate option; and delivering the requested item of content to the at least one user device.

18. A non-transitory computer-readable storage medium storing a computer program element comprising computer program code to, when loaded into a computer system and executed thereon, cause the computer system to perform the method of claim 1.

* * * * *